(12) United States Patent
Kalman et al.

(10) Patent No.: US 6,756,702 B1
(45) Date of Patent: Jun. 29, 2004

(54) TRANSPORT-LAG COMPENSATOR

(75) Inventors: Gabor Kalman, Palos Verdes, CA (US); Colin Huggett, Torrance, CA (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 10/323,093

(22) Filed: Dec. 18, 2002

(51) Int. Cl.⁷ ............................................. H01H 47/00
(52) U.S. Cl. .......................... 307/125; 363/95; 363/40; 318/805
(58) Field of Search .......................... 307/125; 363/40, 363/39; 318/805–808, 812

(56) References Cited

U.S. PATENT DOCUMENTS

| | | |
|---|---|---|
| 5,717,584 A | 2/1998 | Rajashekara et al. |
| 5,949,204 A | 9/1999 | Huggett et al. |
| 6,023,417 A | 2/2000 | Hava et al. |
| 6,069,808 A | 5/2000 | Panahi et al. |
| 6,166,928 A | 12/2000 | Chandorkar |
| 6,166,930 A | 12/2000 | Czerwinski |
| 6,301,136 B1 | 10/2001 | Huggett et al. |
| 6,316,920 B1 * | 11/2001 | Huggett et al. ............. 323/207 |

OTHER PUBLICATIONS

P. K. Kovacs, "Transient Phenomena in Electrical Machines", Elsevier Science Publishing Co. (1984), no month; pp. 13–23.

* cited by examiner

*Primary Examiner*—Shawn Riley
(74) *Attorney, Agent, or Firm*—Oral Cagler, Esq.

(57) ABSTRACT

An electrical power system includes an electric power source providing AC power to a load. A wideband voltage controller provides a wideband control signal vector to the electric power source. A fundamental component removal module interfaces to the AC power, receiving a fundamental component Park vector of the AC voltage, and providing a resonant frequency content in Park vector format of the AC current. A narrow band voltage regulator uses a resonant component Park vector of the AC current and the resonant frequency content in Park vector format to provide a narrow band output vector signal. A dead band compensating circuit rotates narrow band output vector signal by a transport lag compensation angle to provide a compensated control signal vector to the electric power source. The wideband control signal vector and compensated control signal vector are used to regulate the AC power so that the resonant frequency content is attenuated.

19 Claims, 4 Drawing Sheets

TRANSPORT-LAG COMPENSATOR

BACKGROUND OF THE INVENTION

The present invention generally relates to power generation systems, and, more particularly, to power generation systems that utilize digitally or processor controlled inverters to generate AC power.

Inherent within the design of power generation systems that utilize digitally or processor controlled inverters to generate AC power are time intervals that must pass between the sampling of the system state, and the action required as a result of computation in the processor. These time intervals, commonly referred to as the update rate, can be represented as a transport time delay, or transport lag.

Transport lag, i.e. the time delay required to propagate a signal through a physical system, is an inherent property of many physical systems. The transport lag time delay can cause deterioration of performance, or limit performance, of control systems used to operate the physical system. Transport lags can be continuous or discrete in form. For example, a continuous transport lag is exemplified by thickness measurement and control in the process of rolling sheets in steel mills. If the rollers and the measurement sensors have to be separated by a significant distance, due, for example, to the environment near the rollers being too hostile for the measurement sensors, a considerable delay, relative to the amount of steel processed through the rollers, results between the thickness measurement of the rolled sheets and the control of the rollers.

A discrete transport lag may be exemplified by the discrete nature in which a microprocessor samples the state of a system at time zero, and then computes over a period of time (the update rate) what must be done to make the output equal to the commanded reference. Clearly, as the computational time becomes longer (the lower the update rate), the transport lag becomes longer, which in turn limits the response of the control system. A second example of a discrete transport lag is illustrated by the discrete updates of a microprocessor-based control system. The update rate, or the time between updates, is, in essence, a transport lag time delay which is a function of the speed of the microprocessor and the amount of computation demanded by the control system.

Transport lags impact control systems differently than first order lags. While both produce a phase shift between their respective inputs and outputs, the major difference is the attenuation associated with them. For example, in the case of a first order lag at a frequency with a 60 degree delay, there is an approximately 6 decibel (dB) attenuation, while there is no attenuation associated with a corresponding transport lag.

An important feature of a control system is its capability to minimize the effects of external disturbances. The time delay associated with the transport lag deteriorates the performance of the control system by limiting its transient response. Conventional frequency domain based compensation techniques, such as pole-zero cancellations, for example, can provide only first-order approximation in the case of transport lags.

An electrical power distribution system representative of the type used on aircraft may supply electricity in the form of 3-phase power at 400 Hertz (Hz) and 115 Volts alternating current (VAC). Power for such an aircraft electrical power distribution system may be supplied from a 270 Volt direct current (VDC) power source, for example, the alternating current (AC) power output of a generator may be rectified, i.e. converted to DC, and passed through a solid state power converter, also commonly referred to as an inverter, to provide 3-phase alternating current at 400 Hertz and 115 VAC. The electrical power distribution system may be used to power various subsystems and components, for example, electric motors, which can inject noise or power fluctuations into the electrical power distribution system. The power quality of the AC voltage at the interface of the inverter with the electrical power distribution system may be subject to certain requirements and constraints. For military aircraft, for example, the power quality of the AC voltage at the interface of the inverter with the electrical power distribution system is typically specified by a military standard such as Mil-Std 704.

Electrical distribution systems on aircraft are also subject to requirements limiting the amount of electromagnetic energy conducted to the distribution system, which may interfere with other electronics systems on the aircraft, and is referred to as electromagnetic interference (EMI). To meet EMI requirements, which are stringent for military aircraft in particular, electrical distribution systems contain LC-type filters, comprised of inductances and capacitances, such as coils and capacitors, to filter out fluctuations, such as harmonics, in the current and voltage. For example, the electrical power distribution system described above may require an EMI filter at the output of the inverter or may at least contain a 3-phase capacitor bank at the output of the inverter. The LC filter circuits are prone, however, to harmonic resonance, i.e., such circuits may resonate at certain frequencies.

For example, an electric motor powered by the electric power distribution system may inject some amount of current harmonics into the distribution system, despite interfacing with its feeder through appropriate EMI filters. The frequency of the harmonics may vary with the speed of the electric motor. At some intermediate speeds, the current harmonics injected by the electric motor resonate with some of the LC filter components situated at or near the electric motor. The amplitude of the resonant currents circulating throughout the electrical power distribution system may become so large as to create unacceptable voltage fluctuation, or ripple, at the output of the inverter. Such large voltage ripples are unacceptable because they interfere with voltage control of the electric power distribution system, and may even interfere with voltage control to the extent of creating limit-cycle conditions, and because they exceed allowable power quality limits.

The conventional, wideband voltage controller used to regulate voltage in an electric power distribution system, such as described above, has insufficient selectivity to minimize the effects of external disturbances, such as voltage and current fluctuations due to EMI and resonance, in electric power distribution systems with significant transport lag. By merely increasing the selectivity of the voltage controller in a system with significant transport lag, voltage control to minimize the effects of external disturbances can be achieved over a narrow range of frequencies of a disturbance, but by merely increasing the selectivity of the voltage controller, the necessary voltage control for disturbances over the broad range of frequencies outside the narrow range is lost.

As can be seen, there is a need, in electrical power distribution systems, for a voltage controller with sufficient selectivity to control voltage fluctuations over a narrow range of frequencies of a disturbance, which can operate independently of, but in conjunction with, a wide band voltage controller. There is also a need, in electrical power distribution systems with significant transport lag, for a transport lag compensation technique which can eliminate performance deterioration of the voltage control system due to transport lags.

SUMMARY OF THE INVENTION

The present invention provides, in electrical power distribution systems, a transport lag compensator for voltage regulation, with sufficient selectivity to minimize the effects of external disturbances, and which can operate independently of, but in conjunction with, a wide band voltage controller. The present invention also provides, in electrical power distribution systems with significant transport lag, a transport lag compensation technique which can eliminate performance deterioration of the voltage control system due to transport lags.

In one aspect of the present invention, an electrical power system includes an electric power source capable of providing AC power to a load; a wideband voltage controller, which provides a wideband control signal vector to the electric power source; a fundamental component removal module having an interface to the AC power, receiving a fundamental component Park vector of the AC voltage, and providing a resonant frequency content in Park vector format of a resonant frequency content of the AC power from the interface; a narrow band voltage regulator receiving a resonant component Park vector of the AC voltage and current, receiving the resonant frequency content in Park vector format from the fundamental component removal module, and using the resonant component Park vector of the AC voltage and the resonant frequency content in Park vector format to provide a narrow band output vector signal; and a dead band, or transport lag, compensating circuit, which rotates the narrow band output vector signal by a transport lag compensation angle to provide a compensated control signal vector to the electric power source, where the wideband control signal vector and the compensated control signal vector are used to regulate the AC power and the resonant frequency content is attenuated in regulating the AC power.

In another aspect of the present invention, an electrical power system includes an electric power source adapted for providing AC power to a load; a wideband voltage controller, which provides a wideband control signal vector to the electric power source; a fundamental component removal module having an interface to the AC power, receiving a fundamental component Park vector of the AC power, and providing a resonant frequency content in Park vector format of a resonant frequency content of the AC power from the interface; a narrow band voltage regulator receiving a resonant component Park vector of the AC voltage, receiving the resonant frequency content in Park vector format from the fundamental component removal module, and using the resonant component Park vector of the AC voltage and the resonant frequency content in Park vector format to provide a narrow band output vector signal; a dead band, or transport lag, compensating circuit configured to rotate the narrow band output vector signal by a transport lag compensation angle to provide a compensated control signal vector; a decoupling module for assuring that the resonant frequency content is not included in the wideband control signal vector provided by the voltage controller; a summer for combining the compensated control signal with the wideband control signal vector to form a control signal vector, and a gating logic module, which uses the control signal vector to control the electric power source to regulate the AC voltage so that the resonant frequency content is attenuated in regulating the AC power.

In yet another aspect of the present invention, an electrical power system includes an electric power source adapted for providing AC power to a load; a wideband voltage controller for providing a wideband control signal vector to the electric power source; a fundamental component removal module having an interface to the AC voltage, receiving a fundamental component Park vector of the AC power, and providing a resonant frequency content in Park vector format of a resonant frequency content of the AC power from the interface, a narrow band voltage regulator receiving a resonant component Park vector of the AC power, receiving the resonant frequency content in Park vector format from the fundamental component removal module, and using the resonant component Park vector of the AC power and the resonant frequency content in Park vector format to provide a narrow band output vector signal, a dead band, or transport lag, compensating circuit, which rotates the narrow band output vector signal by a transport lag compensation angle to provide a compensated control signal vector, a decoupling module for assuring that the resonant frequency content is not included in the wideband control signal vector provided by the voltage controller; a summer for combining the compensated control signal vector with the wideband control signal vector to form a control signal vector; and a gating logic module, which uses the control signal vector to control the electric power source to regulate the AC power so that the resonant frequency content is attenuated in regulating the AC power.

The fundamental component removal module includes a first rotator, which rotates a Park vector of the AC voltage by the fundamental component Park vector of the AC voltage to provide a signal referenced to a fundamental synchronous frame; a high pass filter which passes the resonant frequency content in the signal referenced to the fundamental synchronous frame and blocks a fundamental component of the AC voltage; and a second rotator, which rotates the signal referenced to the fundamental synchronous frame by the negative of the fundamental component Park vector of the AC voltage to provide the resonant frequency content in Park vector format referenced to a stationary frame.

The narrow band voltage regulator includes a first rotator, which rotates the resonant frequency content in Park vector format referenced to the stationary frame by the resonant component Park vector of the AC power to provide a resonance signal referenced to a resonant synchronous frame; a PI-regulator, which regulates the resonance signal referenced to the resonant synchronous frame against a zero-valued command signal; and a second rotator, which rotates an output signal of the PI-regulator by the negative of the resonant component Park vector of the AC power to provide the narrow band output vector signal in Park vector format referenced to the stationary frame.

The dead band, or transport lag, compensating circuit includes a transport lag angle module, which adjusts the transport lag compensation angle to be commensurate with the resonant frequency content; and a transport lag rotator, which rotates the narrow band output vector signal by the transport lag compensation angle to provide the compensated control signal vector.

In a further aspect of the present invention, a method for electrical power distribution includes the steps of: supplying electric power from an electric power source adapted for providing AC power to a load; providing a wideband control signal vector for controlling the electric power source;

removing a fundamental frequency component from the AC power and providing a resonant frequency content in Park vector format of a resonant frequency content of the AC power using a fundamental component Park vector of the AC voltage; providing a narrow band output vector signal using the resonant frequency content in Park vector format and a resonant component Park vector of the AC power; rotating the narrow band output vector signal by a transport lag compensation angle to provide a compensated control signal vector; decoupling the resonant frequency content from the wideband control signal vector using the resonant frequency content in Park vector format; combining the compensated control signal vector with the wideband control signal vector to form a control signal vector; logically processing the control signal vector to control the electric power source to regulate the AC power so that the resonant frequency content is attenuated in regulating the AC power.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides, in electrical power distribution systems, a transport lag compensator for voltage regulation. Prior art, conventional wide band voltage controllers lack sufficient selectivity to minimize the effects of external disturbances, such as voltage and current fluctuations due to electro-magnetic interference (EMI) and resonance with various system components, for example, LC-filters, i.e., filters comprising capacitative and inductive components. This lack is especially problematical in electrical power generation systems with significant transport lag, which causes serious deterioration in performance of the voltage controller. In one embodiment, the present invention overcomes this deficiency by phase locked loop tracking of the frequency of the disturbance to provide narrow band selectivity. Furthermore, in one embodiment, the present invention can operate independently of the wideband voltage controller by providing a decoupling signal, to preclude interaction between the narrow band transport lag compensator and the wide band voltage controller, while also operating in conjunction with the wideband voltage controller by adding the control signal of the transport lag compensator of the present invention to the control signal of the wide band voltage controller.

The present invention also provides, in electrical power distribution systems with significant transport lag, a transport lag compensation technique that can eliminate prior art performance deterioration of the voltage control system due to transport lags. The transport lag compensator of the present invention provides a correction for the transport lag commensurate with the frequency of the disturbance. Synchronization with respect to the resonant currents, i.e., the disturbance signals, is application specific. For example, if the disturbance represents the largest characteristic harmonic of a rectifier type load, the reference signal can be phase locked to the 5th harmonic of the fundamental. Conversely, if the disturbance represents a non-characteristic harmonic of the load, i.e., a specific circuit resonance, a permanent pre-calculation of the compensation frequency is not feasible, and an event trigger will have to initiate the phase lock. Such an event trigger would extract the resonant component of the voltage vector, and determine if the amplitude exceeded a previously determined threshold.

Figure 1:
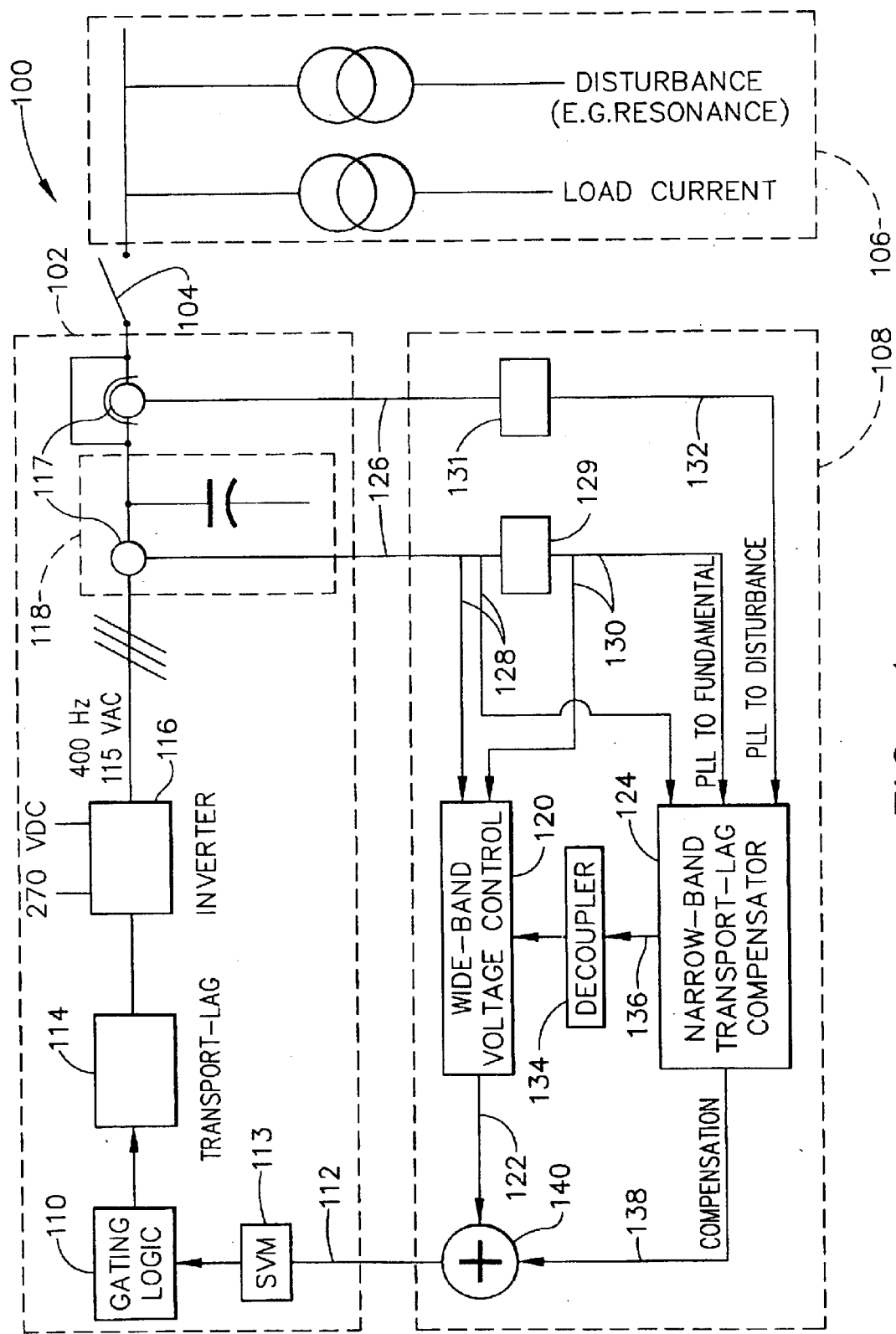
FIG. 1 is a block diagram of an electrical power distribution system with transport lag compensation, according to one embodiment of the present invention.

Referring now to FIG. 1, electrical power system 100 is illustrated. Electrical power system 100 includes transport lag compensation, in accordance with one embodiment. FIG. 1 shows that electrical power system 100 may be conceptually divided into a controlled plant 102, comprising an electric power source adapted for providing alternating current (AC) power to a load, a switch 104 connecting controlled plant 102 to a load 106, and a voltage control module 108. For example, the AC power may be supplied at 400 Hertz (Hz) and 115 Volts AC (VAC), as indicated in FIG. 1. Switch 104 may comprise switches and circuit breakers for providing safety and control over power distribution. Load 106 may comprise various loads, indicated as a load current source in FIG. 1 and resonant frequency current sources, such as caused by resonance or other disturbances as indicated in FIG. 1. Voltage control module 108 may comprise a voltage controller for regulating the power output of controlled plant 102.

Controlled plant 102 may include gating logic module 110 for controlling and regulating the power output of controlled plant 102 based on control signal vector 112 received from voltage control module 108. Controlled plant 102 may also include a space vector modulation (SVM) module 113 for converting control signal vector 112 to signals that the gating logic can use to form gating signals, or commands, for controlling inverter 116, as generally known in the art. Commands from gating logic module 110 are delayed by transport lags inherent in electrical power system 100, as described above, and represented in FIG. 1 by transport lag 114 in controlled plant 102. Commands from gating logic module 110 are used to control and regulate the power output of inverter 116. Inverter 116, for example, may convert 270 Volt direct current (VDC) power, as indicated in FIG. 1, to three phase 115 VAC power. AC link capacitors 118 may provide isolation of the power output of inverter 116 from noise, such as that caused by EMI and harmonic resonance. Current and voltage sensors 117 may be provided for sampling, or measuring, the voltage and current of the power output of inverter 116, and providing signals to voltage control module 108 for the control and regulation of the power output of inverter 116.

Voltage control module 108 may include wideband voltage controller 120 for providing wideband control signal vector 122 for regulating the power output of controlled plant 102. Voltage control module 108 may also include narrowband transport lag compensator 124 which may receive voltage and current sampled measurements from current and voltage sensors 117 through interface 126. The voltage and current sampled measurements received through interface 126 from current and voltage sensors 117 may be sufficient to provide Park vector of AC voltage 128, fundamental component Park vector of AC voltage 130, and resonant component Park vector of AC resonant current 132. For example, fundamental component Park vector of AC voltage 130 may be provided by reference frame extraction circuit 129, and resonant component Park vector of AC resonant current 132 may be provided by reference frame extraction circuit 131, both as known in the art. Reference frame extraction circuit 129 may be similar to reference frame extraction circuit 131. This resonant component reference frame may be calculated by reference frame extraction circuit 131 as follows (reference FIG. 4). The Park vector of the AC current provided by sensor 117 is calculated in the stationary reference frame and applied to the reference frame extraction circuit 131, shown in FIG. 4. The input current Park vector 401 may contain both the fundamental frequency and resonant frequency. This input current Park vector 401 is transferred to the synchronous reference frame 405, and the output passed through a high pass filter (HPF) 410 to remove the fundamental current in the synchronous reference frame. The remaining signal 412, comprising the resonant current vector in the fundamental synchronous frame, is converted back to the stationary reference frame 415. This signal 416 is then operated upon by the vector phase lock loop 400 from which the reference frame of the resonant frequency is computed. For example, phase lock loop 400 may comprise multiplier 418, loop filter 420, integrator 422, and rotators 424 and 426. Multiplier 418 may multiply vector signal 416 by loop feedback vector 425 and provide vector cross product 419 to loop filter 420. Loop filter 420 may provide resonant frequency 472 to transport lag angle module 372 as well as to integrator 422. Integrator 422 may provide the vector angle $\Psi$, signal 423, to rotators 424 and 426. Rotator 424 may provide loop feedback vector 425 to multiplier 418. Rotators 424 and 426 may also provide resonant component Park vector of AC resonant current 332 (in the reference frame of the resonant current) to narrow band voltage regulator 344, shown in FIG. 3.

Park vector of AC voltage 128, and reference frame of the fundamental derived from the capacitor bank voltage vector (fundamental component Park vector of AC voltage 130) is supplied to both the wideband voltage controller 120 and the narrowband transport lag compensator 124. The reference frame of the resonant component of the Park vector of AC resonant current 132 may be used by voltage controller lag compensator (narrowband transport lag compensator 124) in conjunction with wideband voltage controller 120 to generate the command signal 112 to the gating logic 110 of the power inverter 102 for regulating the power output of controlled plant 102. Voltage control module 108 may also include decoupling module 134 which decouples the two controllers and precludes controller cross-coupling. Narrowband transport lag compensator 124 provides decoupling signal 136 to decoupling module 134 for assuring that any resonant frequency content of the Park vector of AC voltage 128 is not included in wideband control signal vector 122 provided by wideband voltage controller 120. Narrowband transport lag compensator 124 provides compensated control signal vector 138 to summer 140, also referred to as "summer module". The summer module 140 may combine compensated control signal vector 138 with wideband control signal vector 122 to provide control signal vector 112 for controlling and regulating the power output of controlled plant 102.

Figure 2:
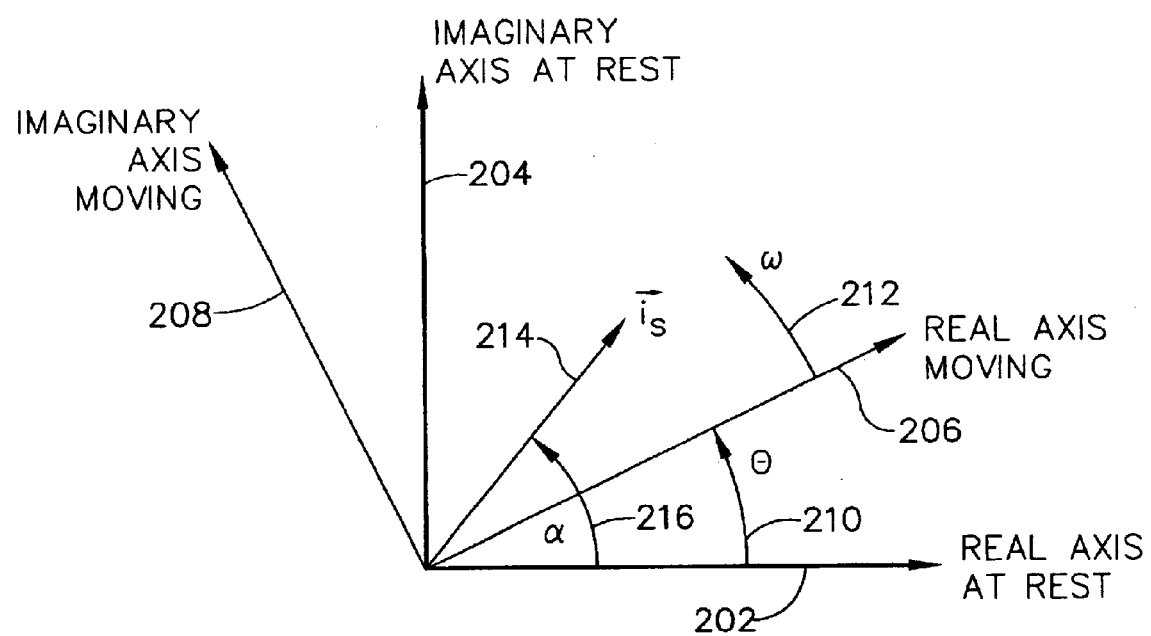
FIG. 2 is an illustration of a Park vector representation of a stator current vector and transformation of the Park vector representation between stationary and moving reference frames.

Referring now to FIG. 2, a Park vector representation of electrical current, i.e., a stator current vector, is shown as an example to illustrate the transformation of the Park vector representation of the stator current vector between stationary and moving, or synchronous, reference frames. Although the stator current vector is used to illustrate the present example, any measurable vector quantity associated with any suitable electrical machine could be used, such as voltages or magnetic fluxes, for example. An introduction to the concept of Park vectors in connection with electrical machines is given by P. K. Kovacs in "Transient Phenomena in Electrical Machines," Elsevier Science Publishing Co. (1984). A voltage controller using Park vectors for eliminating a rotor position sensor is disclosed in U.S. Pat. No. 6,301,136, entitled "Floating Frame Controller", issued on Oct. 9, 2001, and assigned to the assignee of the present invention. The disclosure in that patent is hereby incorporated by reference into the present application.

FIG. 2 shows a stationary reference frame, i.e. a reference frame that is fixed in space relative to the electrical machine in the present example. The stationary reference frame comprises real axis at rest 202 and imaginary axis at rest 204. FIG. 2 also shows a moving reference frame, which may be a synchronous reference frame, i.e. a reference frame that moves at the same speed and in synchronization with the rotor of the associated electrical machine, comprising real axis moving 206 and imaginary axis moving 208. As seen in FIG. 2, the moving reference frame is rotated from the stationary reference frame by transformation angle θ 210. Also as seen in FIG. 2, the moving reference frame is rotating with respect to the stationary reference frame at an angular speed ω 212. Thus, if angular speed ω 212 is known, transformation angle θ 210 can be calculated from angular speed ω 212 using the equation:

$$\theta = \theta_0 + \int \omega \, dt \quad (1)$$

where $\theta_0$ is the initial position of the moving reference frame at time t=0. In other words, transformation angle θ can be approximated, or estimated, by integrating an estimated angular speed of the moving reference frame. In the case of a synchronous reference frame, the estimated angular speed of the synchronous reference frame is the estimated angular speed of the rotor of the electrical machine.

In the present example, Park vector $\vec{i}_S$ 214 represents the current as a vector in space, and may be referred to as the space vector of the winding current. As seen in FIG. 2, the position of Park vector $\vec{i}_S$ 214 can be given in, i.e., given relative to, either the stationary or the moving reference frame. Using a three phase electrical machine, as in the present example, Park vector $\vec{i}_S$ 214 can be determined from the three stator winding current scalar quantities $i_a$, $i_b$, and $i_c$, which are the electric currents in each of the three individual stator windings of the three phase electric machine. Measurement of the scalar quantities $i_a$, $i_b$, and $i_c$ can be obtained, for example, using appropriate sensors or measuring devices as known in the art. For a three phase electrical machine, Park vector $\vec{i}_S$ 214 is defined as:

$$\vec{i}_S = 2/3(i_a + \vec{a} i_b + \vec{a}^2 i_c) \quad (2)$$

where $\vec{a}$ is the spatial relationship of the stator windings within the machine. For a three phase machine, as in the present example, $\vec{a}$ is the complex number $$\vec{a} = -\frac{1}{2} + j\sqrt{\frac{3}{2}} = e^{j\frac{2\pi}{3}}$$

viewed as a vector in the complex plane and $\vec{a}^2$ is the complex number $$\vec{a}^2 = -\frac{1}{2} - j\sqrt{\frac{3}{2}} = e^{-j\frac{2\pi}{3}}$$

viewed as a vector in the complex plane.

As seen in FIG. 2, angle α 216 describes the position of Park vector $\vec{i}_s$ 214 relative to the stationary reference frame comprising real axis at rest 202 and imaginary axis at rest 204. Thus, Park vector $\vec{i}_s$ 214 can be represented in the stationary reference frame using polar coordinates as:

$$\vec{i}_s = i_s e^{j\alpha} \quad (3)$$

where $i_s$ is the amplitude, or length, of Park vector $\vec{i}_s$ 214. As seen in FIG. 2, angle α 216 minus transformation angle θ 210 describes the position of Park vector $\vec{i}_s$ 214 relative to the moving reference frame, which may be a synchronous reference frame, comprising real axis moving 206 and imaginary axis moving 208. Thus, Park vector $\vec{i}_s$ 214 can be represented in the moving, or rotating, reference frame using polar coordinates as:

$$\vec{i}_s^r = i_s e^{j(\alpha-\theta)} = \vec{i}_s e^{-j\theta} \quad (4)$$

where, again, $i_s$ is the amplitude, or length, of Park vector $\vec{i}_s$ 214, which is Park vector $\vec{i}_s^r$ in the rotating, i.e., moving, or synchronous reference frame. The second equality in equation (4) shows that transformation of Park vector coordinates from a stationary frame to a synchronous (rotating) frame is effected by multiplying the stationary frame Park vector by the complex number $e^{-j\theta}$, i.e. rotating the stationary frame Park vector through the negative of the angle θ, to obtain the synchronous frame Park vector. The complex number $e^{-j\theta}$ may also be written as $\exp(-j\theta)$.

For the purposes of determining rotor position without a rotor position sensor, not only the three stator winding current scalar quantities $i_a$, $i_b$, and $i_c$ of the present example, but any electrical signal of the generator, or electrical machine, can be used as a synchronous reference frame so long as the Park vector of the filtered or unfiltered signal—in a stationary reference frame—rotates at the rotor speed.

Figure 3:
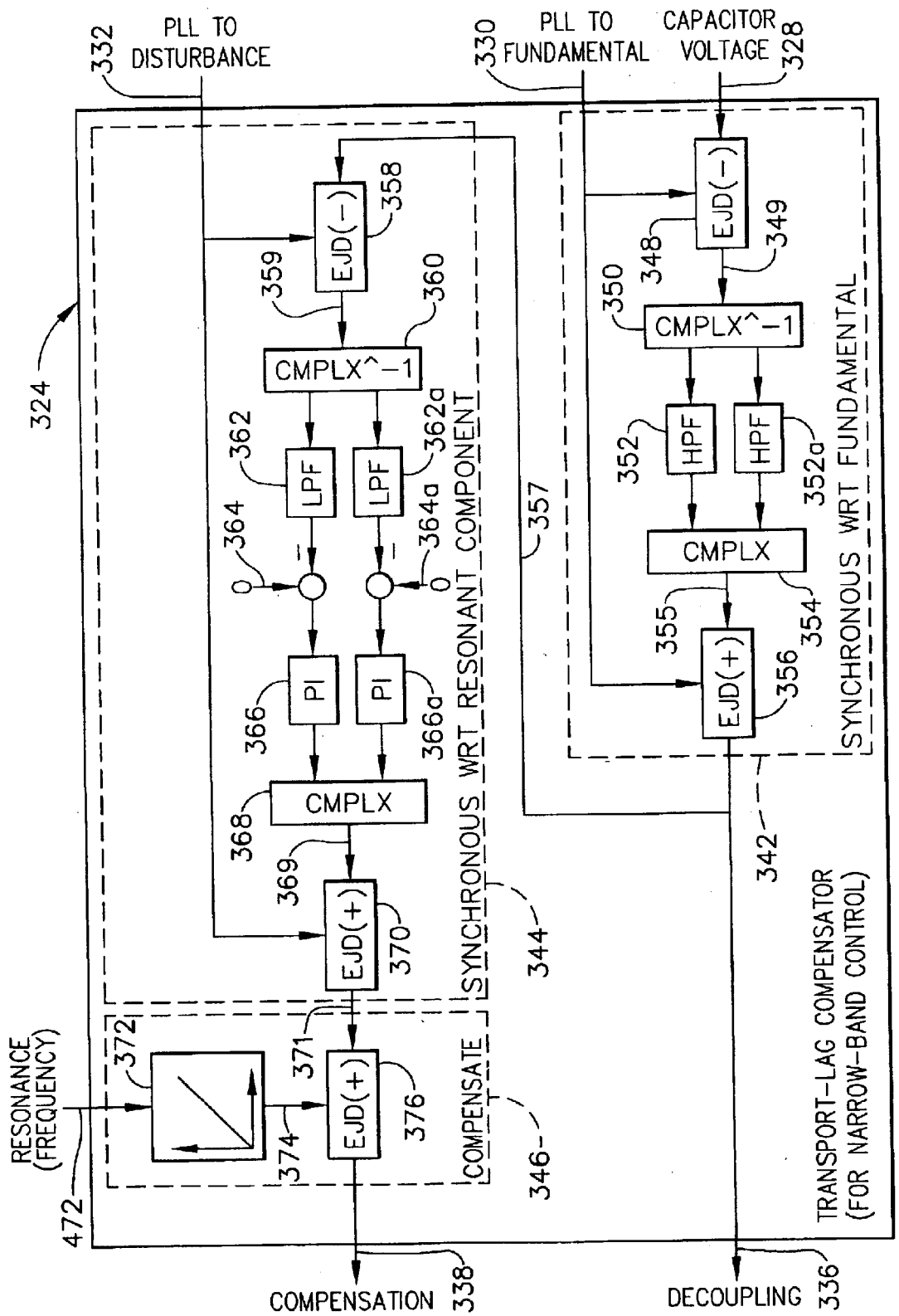
FIG. 3 is a block diagram of a transport lag compensator, according to one embodiment of the present invention.
Figure 4:
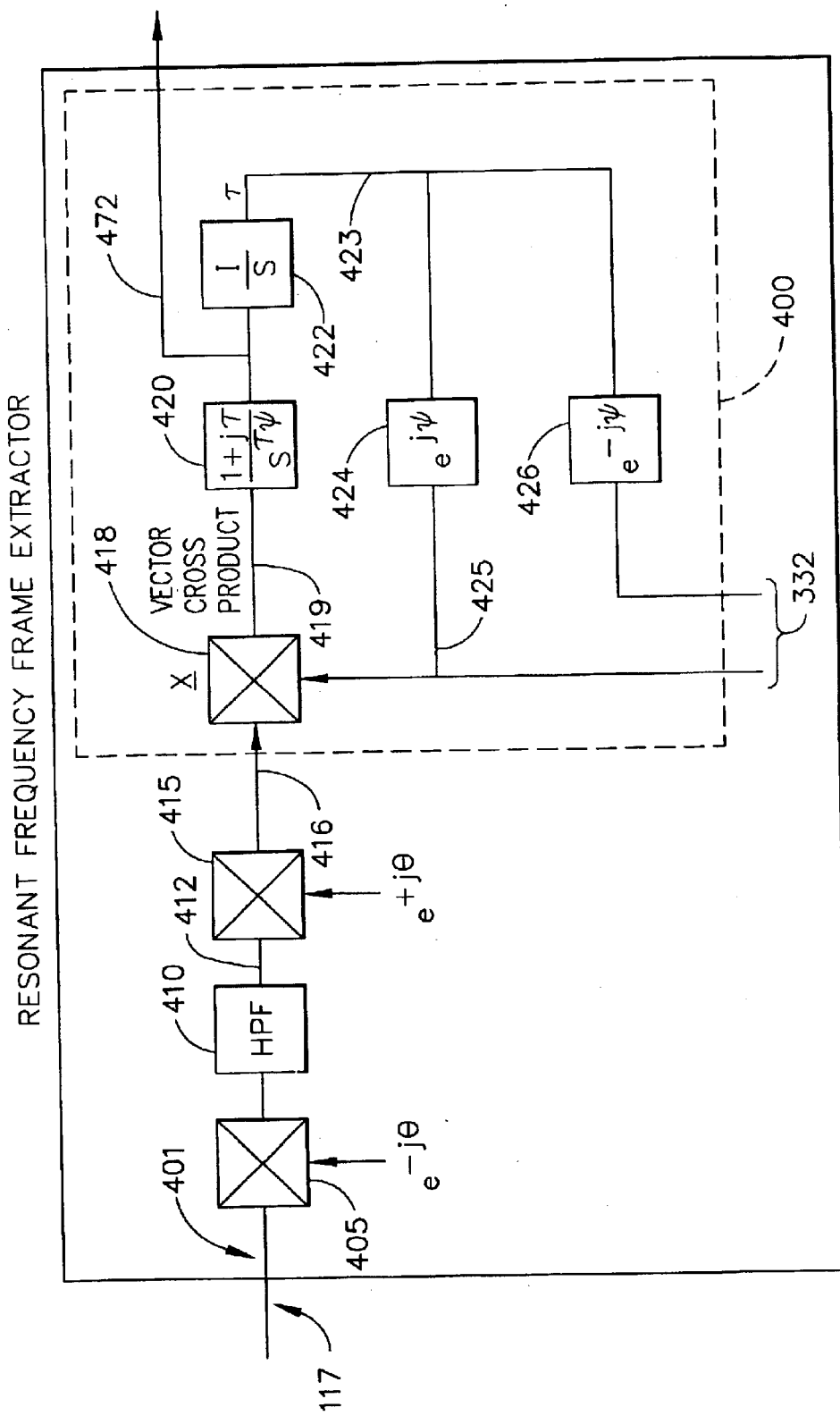
FIG. 4 is a block diagram of a resonant frequency frame extractor, according to one embodiment of the present invention.

Referring now to FIG. 3, narrowband transport lag compensator 324 is illustrated according to one embodiment. Certain features and components corresponding to features and components of electrical power system 100, shown in FIG. 1, are numbered in a manner corresponding to the numbering of FIG. 1. Thus, FIG. 3 shows narrowband transport lag compensator 324 corresponding to narrowband transport lag compensator 124; and Park vector of AC voltage 328 corresponding to Park vector of AC voltage 128. Fundamental reference frame signals (fundamental component Park vector of AC voltage 130) correspond to fundamental reference frame signals (fundamental component Park vector of AC voltage 330). The reference frame of the resonant component of the Park vector of AC resonant current 332 corresponds to the reference frame of the resonant component of the Park vector of the AC resonant current 132; decoupling signal 336 corresponds to decoupling signal 136; and compensated control signal vector 338 corresponds to compensated control signal vector 138 shown in FIG. 1.

Narrowband transport lag compensator 324 may include fundamental component removal module 342, narrow band voltage regulator 344, and dead band compensating circuit 346, also referred to as "transport lag compensating circuit". Vectors, signals, and other quantities processed in fundamental component removal module 342 are more efficiently referenced to a frame that is synchronous with respect to the fundamental component of the frequency of AC voltage output of inverter 116. In the present example used to illustrate one embodiment, the fundamental frequency component of the AC voltage output of inverter 116 is 400 Hz, as indicated in FIG. 1. Vectors, signals, and other quantities processed in narrow band voltage regulator 344 are more efficiently referenced to a frame that is synchronous with respect to the resonant component, i.e., the component of a disturbance, of the AC power output of inverter 116.

Fundamental component removal module 342 may receive Park vector of AC voltage 328, which may represent, for example, the voltage across link capacitor 118, i.e., the AC output voltage of inverter 116. Fundamental component removal module 342 may also receive fundamental reference frame of AC voltage 330. This reference frame of AC voltage 330 may be provided, for example, from a phase locked loop included in interface 126 and using the signals provided by current and voltage sensors 117.

Fundamental component removal module 342 may include rotator 348. Park vector of AC voltage 328 may be fed to rotator 348, which may use fundamental component Park vector of AC voltage 330 to rotate Park vector of AC voltage 328, as described above in connection with FIG. 2, into a frame that is synchronous with respect to the fundamental component of the frequency of AC voltage output of inverter 116, i.e., a fundamental synchronous frame, to produce signal 349 referenced to a fundamental synchronous frame. Signal 349 referenced to a fundamental synchronous frame is fed through complex operator 350, which splits the vector into real and imaginary components, high pass filters 352 and 352a, and complex operator 354, which re-assembles the filtered components to form a vector, to produce resonant frequency content 355 in a signal referenced to a fundamental synchronous frame. Rotator 356 may use fundamental component Park vector of AC voltage 330 to rotate Park vector of resonant frequency content 355 in a signal referenced to a fundamental synchronous frame to produce resonant frequency content in Park vector format 357 referenced to a stationary frame. Thus, rotator 356 performs the reverse operation of rotator 348, as generally described above in connection with FIG. 2. Resonant frequency content in Park vector format 357 may be provided as decoupling signal 336 to decoupling module 134 for assuring that resonant frequency content in Park vector format 357 of the Park vector of AC voltage 328 is not included in wideband control signal vector 122 provided by wideband voltage controller 120.

As shown in FIG. 3, narrow band voltage regulator 344 may receive resonant frequency content in Park vector format 357 referenced to a stationary frame. Narrow band voltage regulator 344 may also input the reference frame of the resonant component Park vector of AC resonant current 332. Resonant component Park vector of AC resonant current 332 may be provided, for example, by a phase locked loop included in interface 126 and using the signals provided by current and voltage sensors 117. (Reference FIG. 4.)

Narrow band voltage regulator 344 may include rotator 358. Resonant frequency content in Park vector format 357 of the Park vector of AC voltage 328 may be fed to rotator 358, which may use the reference frame of the AC resonant current 332 to rotate resonant frequency content in Park vector format 357, as generally described above in connection with FIG. 2, into a frame that is synchronous with respect to the resonant component of the frequency of AC resonant current output of inverter 116, i.e., a resonant synchronous frame, to produce resonance signal 359 referenced to a resonant synchronous frame. Resonance signal 359 referenced to a resonant synchronous frame may be fed through complex operator 360, which splits the vector into real and imaginary components, and low pass filters 362 and 362a. Resonance signal 359 may be regulated against zero-valued command signals 364 and 364a by proportional integral (PI) regulators, PI-regulators 366 and 366a. For example, Park vector resonance signal 359 is a complex number having a real part and an imaginary part; each of the real part and the imaginary part of resonance signal 359 may be compared to zero-valued command signal 364, 364a to generate an error signal that is regulated by PI-regulators 366 and 366a. The regulated error signals may then be passed through complex operator 368, which re-assembles the components, i.e., real and imaginary parts, to form a vector, to produce output signal 369 of PI-regulators 366 and 366a, referenced to a resonant synchronous frame. Rotator 370 may use resonant component Park vector of AC resonant current 332 to rotate Park vector of output signal 369, referenced to a resonant synchronous frame, to produce narrow band output vector signal 371 in Park vector format, referenced to a stationary frame. Thus, rotator 370 performs the reverse operation of rotator 358, rotating resonant synchronous frame output signal 369 into the stationary frame narrow band output vector signal 371, as generally described above in connection with FIG. 2.

As shown in FIG. 3, the output of the narrow band voltage regulator 344, i.e., narrow band output vector signal 371, is applied to the dead band, or transport lag, compensating circuit 346. The purpose of dead band, or transport lag, compensating circuit 346 is to compensate for the transport lag 114 caused by the inverter update rate at the resonant frequency. The input resonant frequency 472 derived from PLL 400 (see FIG. 4) is used to rotate the narrow band output vector signal 371 by an angle (transport lag compensation angle 374) computed (for example, by transport lag angle module 372) from the resonant frequency and the known transport time delay. The angle (transport lag compensation angle 374) that the narrow band output vector signal 371 is rotated through to compensate for the transport time delay is computed from the product of the resonant frequency and the transport time delay. This angle is then used to rotate the output vector of narrow band voltage regulator 344 to produce the narrow band transport time compensated signal (compensated control signal vector 338).

Dead band, or transport lag, compensating circuit 346 may include transport lag rotator 376. Narrow band output vector signal 371 in Park vector format, which is a Park vector referenced to a stationary frame, may be fed to transport lag rotator 376, which may use transport lag compensation angle 374 to rotate narrow band output vector signal 371, as generally described above in connection with FIG. 2, to produce compensated control signal vector 338, which also is a Park vector referenced to a stationary frame. Compensated control signal vector 338 may be fed to summer 140, as described above, to be combined with wideband control signal vector 122 to provide control signal vector 112 for controlling and regulating the power output of controlled plant 102.

It should be understood, of course, that the foregoing relates to preferred embodiments of the invention and that modifications may be made without departing from the spirit and scope of the invention as set forth in the following claims.

We claim:

1. An electrical power system comprising:

an electric power source providing AC power comprising an AC voltage and an AC resonant current to a load;

a wideband voltage controller providing a wideband control signal vector to said electric power source;

a fundamental component removal module having an interface to said AC power and receiving a fundamental component Park vector of said AC voltage, said fundamental component removal module providing a resonant frequency content in Park vector format of a resonant frequency content of said AC resonant current from said interface;

a narrow band voltage regulator receiving a resonant component Park vector of said AC resonant current and receiving said resonant frequency content in Park vector format from said fundamental component removal module, said narrow band voltage regulator using said resonant component Park vector of said AC resonant current and said resonant frequency content in Park vector format to provide a narrow band output vector signal; and a transport lag compensating circuit that rotates said narrow band output vector signal by a transport lag compensation angle to provide a compensated control signal vector to said electric power source, said transport lag compensating circuit using said wideband control signal vector and said compensated control signal vector to regulate said AC power and attenuate said resonant frequency content in regulating said AC power.

2. The electrical power system of claim 1, further comprising a decoupling module that assures that said resonant frequency content is not included in said wideband control signal vector provided by said wideband voltage controller.

3. The electrical power system of claim 1, further comprising a gating logic module and a summer module, wherein said compensated control signal vector is combined with said wideband control signal vector by said summer module to form a control signal vector, said control signal vector is input to said gating logic module, and said gating logic module uses said control signal vector to control said electric power source.

4. The electrical power system of claim 1 wherein said fundamental component removal module comprises:

a first rotator that rotates a Park vector of said AC voltage by said fundamental component Park vector of said AC voltage to provide a signal referenced to a synchronous frame;

a high pass filter that passes said resonant frequency content in said signal referenced to said synchronous frame and blocks a fundamental component of said AC voltage; and a second rotator that rotates said signal referenced to said synchronous frame by the negative of said fundamental component Park vector of said AC voltage to provide said resonant frequency content in Park vector format referenced to a stationary frame.

5. The electrical power system of claim 1 wherein said narrow band voltage regulator comprises:
- a first rotator that rotates said resonant frequency content in Park vector format referenced to a stationary frame by said resonant component Park vector of said AC resonant current to provide a resonance signal referenced to a synchronous frame;
- a PI-regulator that regulates said resonance signal referenced to said synchronous frame against a zero-valued command signal; and
- a second rotator that rotates an output signal of said PI-regulator by the negative of said resonant component Park vector of said AC resonant current to provide said narrow band output vector signal in Park vector format referenced to a stationary frame.

6. The electrical power system of claim 1 wherein said transport lag compensating circuit comprises:
- a transport lag angle module that adjusts said transport lag compensation angle to be commensurate with said resonant frequency content; and
- a transport lag rotator that rotates said narrow band output vector signal by said transport lag compensation angle to provide said compensated control signal vector.

7. The electrical power system of claim 1 wherein said fundamental component Park vector of said AC voltage is provided by a phase locked loop.

8. The electrical power system of claim 1 wherein said resonant component Park vector of said AC resonant current is provided by a phase locked loop.

9. An electrical power system comprising:
- an electric power source that provides AC power comprising an AC voltage and an AC resonant current to a load;
- a wideband voltage controller that provides a wideband control signal vector to said electric power source;
- a fundamental component removal module having an interface to said AC power and receiving a fundamental component Park vector of said AC voltage, said fundamental component removal module providing a resonant frequency content in Park vector format of a resonant frequency content of said AC resonant current from said interface;
- a narrow band voltage regulator receiving a resonant component Park vector of said AC resonant current and receiving said resonant frequency content in Park vector format from said fundamental component removal module, said narrow band voltage regulator using said resonant component Park vector of said AC resonant current and said resonant frequency content in Park vector format to provide a narrow band output vector signal;
- a dead band compensating circuit that rotates said narrow band output vector signal by a transport lag compensation angle to provide a compensated control signal vector;
- a decoupling module that assures that said resonant frequency content is not included in said wideband control signal vector provided by said wideband voltage controller; and
- a gating logic module and a summer module, wherein said compensated control signal vector is combined with said wideband control signal vector by said summer module to form a control signal vector, said control signal vector is input to said gating logic module, and said gating logic module uses said control signal vector to control said electric power source so as to regulate said AC power and attenuate said resonant frequency content in regulating said AC power.

10. The electrical power system of claim 9 wherein said fundamental component removal module comprises:
- a first rotator that rotates a Park vector of said AC voltage by said fundamental component Park vector of said AC voltage to provide a signal referenced to a fundamental synchronous frame;
- a high pass filter that passes said resonant frequency content in said signal referenced to said fundamental synchronous frame and blocks a fundamental component of said AC voltage; and
- a second rotator that rotates said signal referenced to said fundamental synchronous frame by the negative of said fundamental component Park vector of said AC voltage to provide said resonant frequency content in Park vector format referenced to a stationary frame.

11. The electrical power system of claim 9 wherein said narrow band voltage regulator comprises:
- a first rotator that rotates said resonant frequency content in Park vector format referenced to a stationary frame by said resonant component Park vector of said AC resonant current to provide a resonance signal referenced to a resonant synchronous frame;
- a PI-regulator that regulates said resonance signal referenced to said resonant synchronous frame against a zero-valued command signal; and
- a second rotator that rotates an output signal of said PI-regulator by the negative of said resonant component Park vector of said AC resonant current to provide said narrow band output vector signal in Park vector format referenced to a stationary frame.

12. The electrical power system of claim 9 wherein:
said electric power source comprises an inverter; and
said dead band compensating circuit comprises:
- a transport lag angle module that adjusts said transport lag compensation angle to compensate for a transport lag caused by an inverter update rate at a resonant frequency of said resonant frequency content; and
- a transport lag rotator that rotates said narrow band output vector signal by said transport lag compensation angle to provide said compensated control signal vector.

13. The electrical power system of claim 9 wherein said fundamental component Park vector of said AC voltage is provided by a phase locked loop and said resonant component Park vector of said AC resonant current is provided by a phase locked loop.

14. The electrical power system of claim 9 further comprising an inverter and a space vector modulation module that converts said control signal vector to signals that said gating logic module uses to form gating commands that control said inverter.

15. An electrical power system comprising:
- an electric power source that provides AC power comprising an AC voltage and an AC resonant current to a load;
- a wideband voltage controller that provides a wideband control signal vector to said electric power source;
- a fundamental component removal module having an interface to said AC power and receiving a fundamental component Park vector of said AC voltage, said fundamental component removal module providing a resonant frequency content in Park vector format of a resonant frequency content of said AC resonant current from said interface, wherein said fundamental component removal module comprises:

a first rotator that rotates a Park vector of said AC voltage by said fundamental component Park vector of said AC voltage to provide a signal referenced to a fundamental synchronous frame;

a high pass filter that passes said resonant frequency content in said signal referenced to said fundamental synchronous frame and blocks a fundamental component of said AC voltage; and a second rotator that rotates said signal referenced to said fundamental synchronous frame by the negative of said fundamental component Park vector of said AC voltage to provide said resonant frequency content in Park vector format referenced to a stationary frame;

a narrow band voltage regulator receiving a resonant component Park vector of said AC resonant current and receiving said resonant frequency content in Park vector format from said fundamental component removal module, said narrow band voltage regulator using said resonant component Park vector of said AC resonant current and said resonant frequency content in Park vector format to provide a narrow band output vector signal, wherein said narrow band voltage regulator comprises:

a third rotator that rotates said resonant frequency content in Park vector format referenced to said stationary frame by said resonant component Park vector of said AC resonant current to provide a resonance signal referenced to a resonant synchronous frame;

a PI-regulator that regulates said resonance signal referenced to said resonant synchronous frame against a zero-valued command signal, and a fourth rotator that rotates an output signal of said PI-regulator by the negative of said resonant component Park vector of said AC resonant current to provide said narrow band output vector signal in Park vector format referenced to said stationary frame;

a transport lag compensating circuit that rotates said narrow band output vector signal by a transport lag compensation angle to provide a compensated control signal vector, wherein said transport lag compensating circuit comprises:

a transport lag angle module that adjusts said transport lag compensation angle to be commensurate with said resonant frequency content; and a transport lag rotator that rotates said narrow band output vector signal by said transport lag compensation angle to provide said compensated control signal vector;

a decoupling module that assures that said resonant frequency content is not included in said wideband control signal vector provided by said voltage controller; and a gating logic module and a summer, wherein said compensated control signal vector is combined with said wideband control signal vector by said summer to form a control signal vector, said control signal vector is input to said gating logic module, and said gating logic module uses said control signal vector to control said electric power source so as to regulate said AC power and attenuate said resonant frequency content in regulating said AC power.

16. A method comprising steps of:

supplying electric power to a load from an electric power source, said electric power being in the form of AC power comprising an AC voltage and an AC resonant current;

providing a wideband control signal vector for controlling said electric power source;

removing a fundamental frequency component from said AC voltage and providing a resonant frequency content in Park vector format of a resonant frequency content of said AC resonant current using a fundamental component Park vector of said AC voltage;

providing a narrow band output vector signal using said resonant frequency content in Park vector format and a resonant component Park vector of said AC resonant current;

rotating said narrow band output vector signal by a transport lag compensation angle to provide a compensated control signal vector;

decoupling said resonant frequency content from said wideband control signal vector using said resonant frequency content in Park vector format;

combining said compensated control signal vector with said wideband control signal vector to form a control signal vector; and logically processing said control signal vector to control said electric power source so as to regulate said AC power and attenuate said resonant frequency content in regulating said AC power.

17. The method of claim 16 wherein said removing step comprises:

rotating a Park vector of said AC voltage by said fundamental component Park vector of said AC voltage to provide a signal referenced to a synchronous frame;

passing said resonant frequency content in said signal referenced to said synchronous frame through a high pass filter and blocking a fundamental component of said AC voltage using said high pass filter; and rotating said signal referenced to said synchronous frame by the negative of said fundamental component Park vector of said AC voltage to provide said resonant frequency content in Park vector format referenced to a stationary frame.

18. The method of claim 16 wherein said step of providing a narrow band output vector signal comprises:

rotating said resonant frequency content in Park vector format referenced to a stationary frame by said resonant component Park vector of said AC resonant current to provide a resonance signal referenced to a synchronous frame;

using a PI-regulator to regulate said resonance signal referenced to said synchronous frame against a zero-valued command signal; and rotating an output signal of said PI-regulator by the negative of said resonant component Park vector of said AG resonant current to provide said narrow band output vector signal in Park vector format referenced to a stationary frame.

19. The method of claim 16 wherein said rotating step comprises:

adjusting said transport lag compensation angle to be commensurate with said resonant frequency content; and rotating said narrow band output vector signal by said transport lag compensation angle to provide said compensated control signal vector.

* * * * *